Oct. 5, 1965 B. M. SOSIN 3,210,682
RADIO FREQUENCY DISTRIBUTED AMPLIFIERS
Filed Feb. 24, 1961
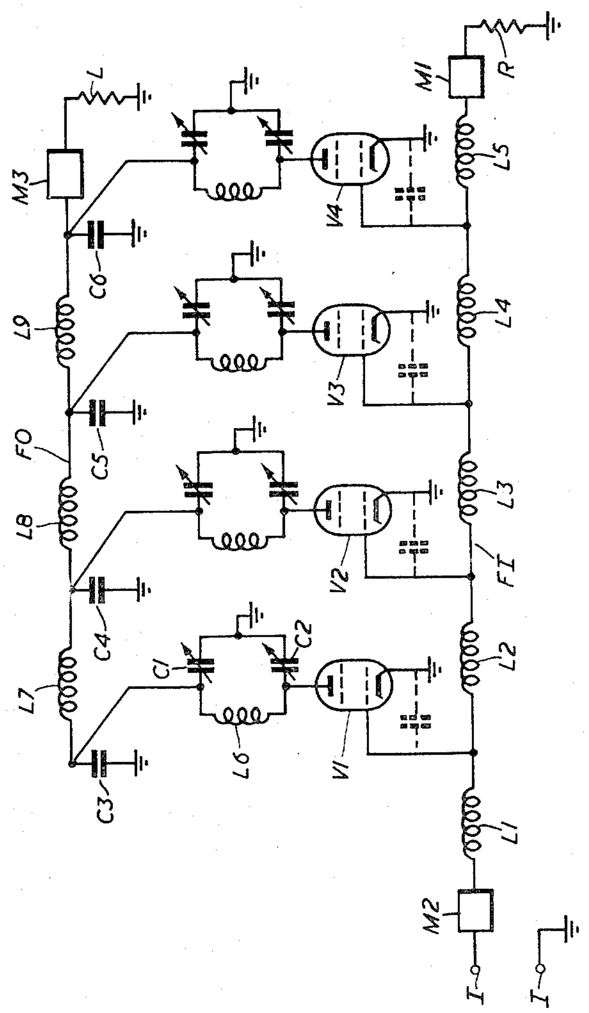
INVENTOR
Boleslaw Marian Sosin
BY Baldwin & Wight
ATTORNEYS // United States Patent Office
3,210,682
Patented Oct. 5, 1965

3,210,682
RADIO FREQUENCY DISTRIBUTED AMPLIFIERS

Boleslaw Marian Sosin, Great Baddow, England, assignor to The Marconi Company Limited, a British company Filed Feb. 24, 1961, Ser. No. 91,460
Claims priority, application Great Britain, Apr. 6, 1960, 12,177/60
7 Claims. (Cl. 330—54)

This invention relates to radio frequency amplifiers and more particularly, although not exclusively, to high power amplifiers capable of operation at any one frequency within a wide frequency band.

Where the output power requirements of such a high power, wide band amplifier are met by using in parallel a plurality of valves the sum of whose individual output powers provides the required total power, the parallel connection of such valves is often found to be unsatisfactory due to difficulties arising from unwanted resonances and spurious modes of operation (because of the combination of the inductances of the connecting leads and the input and output capacities of the valves), and arising from the effective paralleling of the input and output capacities which reduces the width of the frequency band over which the amplifier can operate.

These difficulties may, of course, be overcome by connecting the valves in such manner as to form a so-called distributed amplifier, i.e., an amplifier in which a plurality of valves have their control electrodes fed from spaced points on an input delay or filter line fed with signals to be amplified and their output electrodes feeding into different spaced points on an output delay or filter line from which amplified signals are taken, the delays between the last-mentioned spaced points being substantially equal to those between the corresponding spaced points on the input line. Distributed amplifiers, as at present known, suffer from the defect, however, that they operate with comparatively low efficiency and it is the object of the present invention to provide distributed amplifiers which will be free of the above defect.

According to this invention a distributed amplifier comprises a separate parallel resonant circuit connected in the anode circuit of each of the valves thereof and means for applying output signals developed in said resonant circuits to the output delay or filter line. Preferably the characteristic impedance of the amplifier output delay or filter line is tapered over its length towards its load as known per se.

Preferably each parallel resonant circuit includes means for adjusting the frequency of resonance and means for adjusting the load on the valve in whose anode circuit it is connected. Preferably each parallel resonant circuit comprises a $\pi$ circuit having a series inductive arm and two variable capacity shunt arms, the common junction of the shunt arms being earthed.

Distributed amplifiers in accordance with the present invention may operate under class B or C conditions and hence are capable of higher efficiency than comparable amplifiers as at present known.

The invention is illustrated in the accompanying drawing the single figure of which shows diagrammatically one embodiment thereof. For simplicity the usual valve D.C. supply connection, which will be obvious to those skilled in the art, are not shown.

Referring to the drawing, four similar power transmitting valves V1, V2, V3 and V4, exemplified as tetrodes, have their control grids connected to successive junctions of similar inductances L1, L2, L3, L4 and L5, which together with the valve input capacities (represented in dotted lines) form an input delay or filter line F1 of desired uniform characteristic impedance and bandwidth. The filter line F1 is correctly terminated through the matching network M1, which may be of well known form, by the resistance R.

Input signals to be amplified are applied to the line F1 via the input terminals I and a known matching network M2 and, as will be apparent, substantially equal amplitude signals are, consequently, fed to the control grids of the valves. The grids of the valves are also connected with grid bias means (not shown).

Similar parallel tuned circuits are connected in the anode circuit of all the valves, each tuned circuit comprising a $\pi$ network formed, as shown in the tuned circuit of V1, of an inductance L6 and two variable condensers C1 and C2, the junction point of the condensers being earthed. Each anode is connected to one end of the appropriate inductance L6, the other end of which is connected to a tapping point on an output delay or filter line F0 whose pass band is such as to pass the required range of frequencies.

The output filter line F0 comprises the series connected inductances L7, L8 and L9 and parallel condensers C3, C4, C5 and C6, and is terminated, via a matching network M3, by the load L which may be, in practice, a transmitting aerial. The tapping points on the line F0 to which the anodes of the valves are connected through the tuned circuits are so chosen that the phase delays between successive tapping points are equal to the phase delays in the input filter line F1 between corresponding control grids, and furthermore the characteristic impedance of the output filter line is tapered or decreased in steps, at each of the aforesaid tapping points, towards the load L in such manner that, in operation, the voltage swings at all the tapping points are equal. The principles of the design of filter lines to meet the above stated requirements are, of course, well known and hence it is believed that no further description is required here.

In operation all of the anode tuned circuits are tuned to the particular frequency which is to be amplified by the adjustment of the condensers C1 and C2. As will be apparent, there will be many combinations of values of C1 and C2 which will resonate at the required frequency with the inductance L6 and, in practice, the ranges of values over which C1 and C2 are adjustable are such that the setting of C2 determines the resonance frequency while the setting of C1 determines the valve load impedance although there will, inevitably, be some interaction between the two. In a practical case in an amplifier employing 5 kw. tetrode valves, whose optimum anode load was 2.5K $\Omega$, and intended for operation over the frequency range 4–30 mc./s., C1 was adjustable over the range 100–700 $\mu\mu$f. and C2 over the range 30–200 $\mu\mu$f.

In order satisfactorily to tune the amplifier, it is found desirable to adjust the tuning of all tuned circuits simultaneously and, although this can be done manually, it is preferably carried out by simultaneously operating servo systems which are responsive on the one hand to the phase difference between the valve anodes and control grids for controlling C2 and on the other hand to the ratio of voltage amplitudes at the anodes and control grids for controlling C1.

It will be seen that with an amplifier as above described the anode loads of the valves may be adjusted to their optimum values and are not limited by the valve anode capacities as is the case with distributed amplifiers as at present known. With the anode tuned circuits resonant at the frequency of signals which are applied to the input filter line, the valves will operate efficiently under class B or C conditions, effectively in parallel so far as the output power is concerned, while the input and output capacities of the valves will not add together. Furthermore the amplifier is capable of operating at any given frequency over a wide frequency range, by the expedient of tuning the anode circuits of the valves, and at the same time provides the advantage of wide band untuned input circuits.

I claim:

1. A distributed amplifier comprising an output delay line terminating in a load and a plurality of valves having their anodes connected to different spaced points along said delay line and wherein between the anodes and the respective connections of the output delay line there are inserted parallel resonant circuits which are adjustable to adjust both the frequency of resonance and the load on the valves.

2. A distributed amplifier as claimed in claim 1 wherein the output delay line has a characteristic impedance which is tapered over the length of the said delay line in the direction of the load.

3. A distributed amplifier as claimed in claim 1 wherein each parallel resonant circuit comprises a circuit having a series inductive arm and two variable capacity shunt arms, the common junction of the shunt arms being grounded.

4. A distributed amplifier as claimed in claim 1 wherein the valves are adapted to operate under class B conditions.

5. A distributed amplifier as claimed in claim 1 wherein the valves are adapted to operate under class C conditions.

6. A distributed amplifier comprising a plurality of valves, each of which includes a control electrode and an anode; an input delay line fed with signals to be amplified; first connection means for connecting the control electrodes of said valves to different spaced points along said input delay line; an output delay line terminating in a load; and second connection means for connecting the anodes of said valves to different spaced points along said output delay line, said second connection means comprising parallel resonant circuits which are adjustable to adjust both the frequency of resonance and the load on said valves.

7. A distributed amplifier as claimed in claim 6 wherein each parallel resonant circuit comprises a circuit having a series inductive arm and two variable capacity shunt arms, the common junction of the shunt arms being grounded.

References Cited by the Examiner

UNITED STATES PATENTS

| | | | |
|---|---|---|---|
| 2,761,022 | 8/56 | Tongue et al. | 330—54 X |
| 2,930,986 | 3/60 | Kobbe et al. | 330—54 |
| 2,942,199 | 6/60 | Lee | 330—54 |

FOREIGN PATENTS

| | | |
|---|---|---|
| 1,067,888 | 10/59 | Germany. |
| 841,134 | 7/60 | Great Britain. |

OTHER REFERENCES

Article by "Ginzton et al." in the Proceedings of the Institute of Radio Engineers, vol. 36, No. 8, August 1948, pages 956–969.

ROY LAKE, *Primary Examiner.*

BENNETT G. MILLER, NATHAN KAUFMAN, *Examiners.*